Dec. 8, 1959 W. M. GAITTEN 2,916,064
LOG CONVEYING SYSTEM FOR A DEBARKING MACHINE
Filed Sept. 26, 1956 7 Sheets-Sheet 1
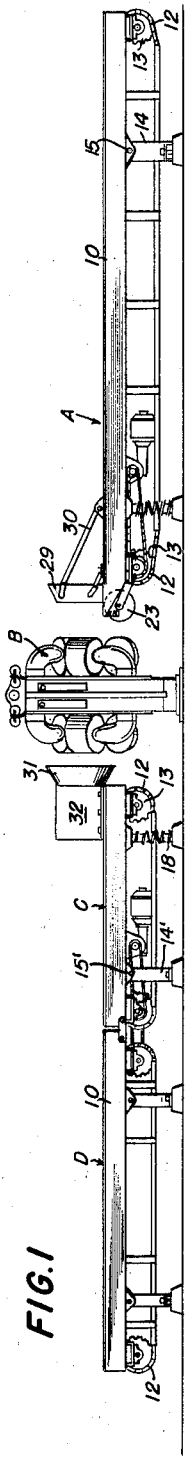
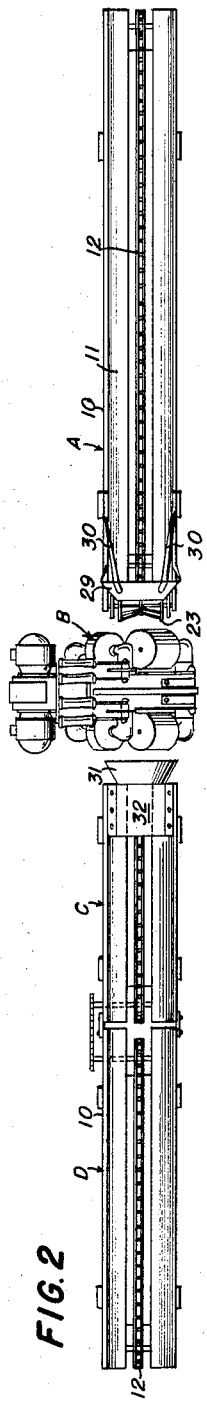
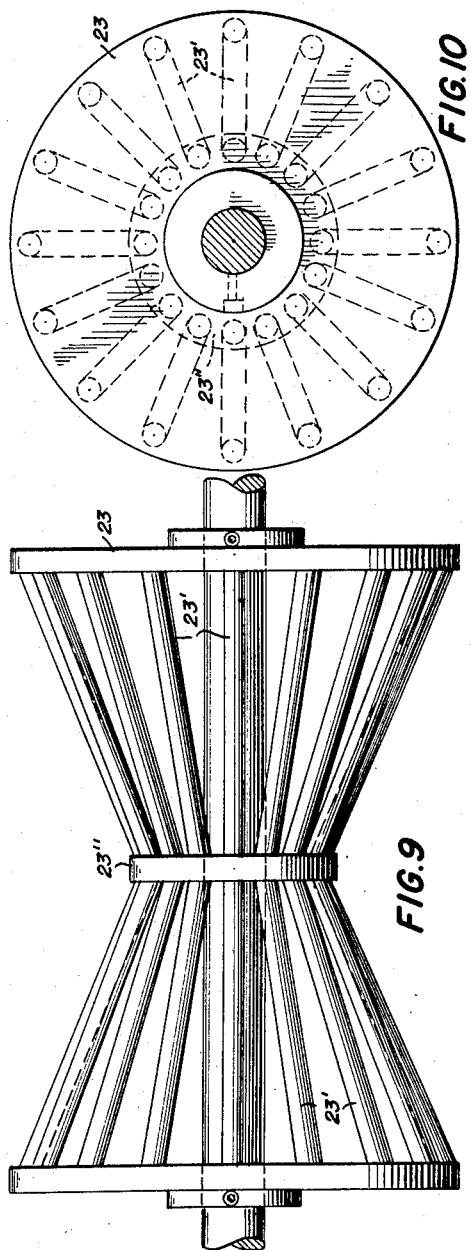
INVENTOR
W. M. GAITTEN
BY
ATTORNEYS Dec. 8, 1959  W. M. GAITTEN  2,916,064
LOG CONVEYING SYSTEM FOR A DEBARKING MACHINE
Filed Sept. 26, 1956  7 Sheets-Sheet 2

INVENTOR
W. M. GAITTEN
BY
ATTORNEYS

Dec. 8, 1959 W. M. GAITTEN 2,916,064
LOG CONVEYING SYSTEM FOR A DEBARKING MACHINE
Filed Sept. 26, 1956 7 Sheets-Sheet 3

INVENTOR
W. M. GAITTEN

ATTORNEY

Dec. 8, 1959 W. M. GAITTEN 2,916,064
LOG CONVEYING SYSTEM FOR A DEBARKING MACHINE
Filed Sept. 26, 1956 7 Sheets-Sheet 4

INVENTOR
W.M. GAITTEN

ATTORNEYS

Dec. 8, 1959 W. M. GAITTEN 2,916,064
LOG CONVEYING SYSTEM FOR A DEBARKING MACHINE
Filed Sept. 26, 1956 7 Sheets-Sheet 5
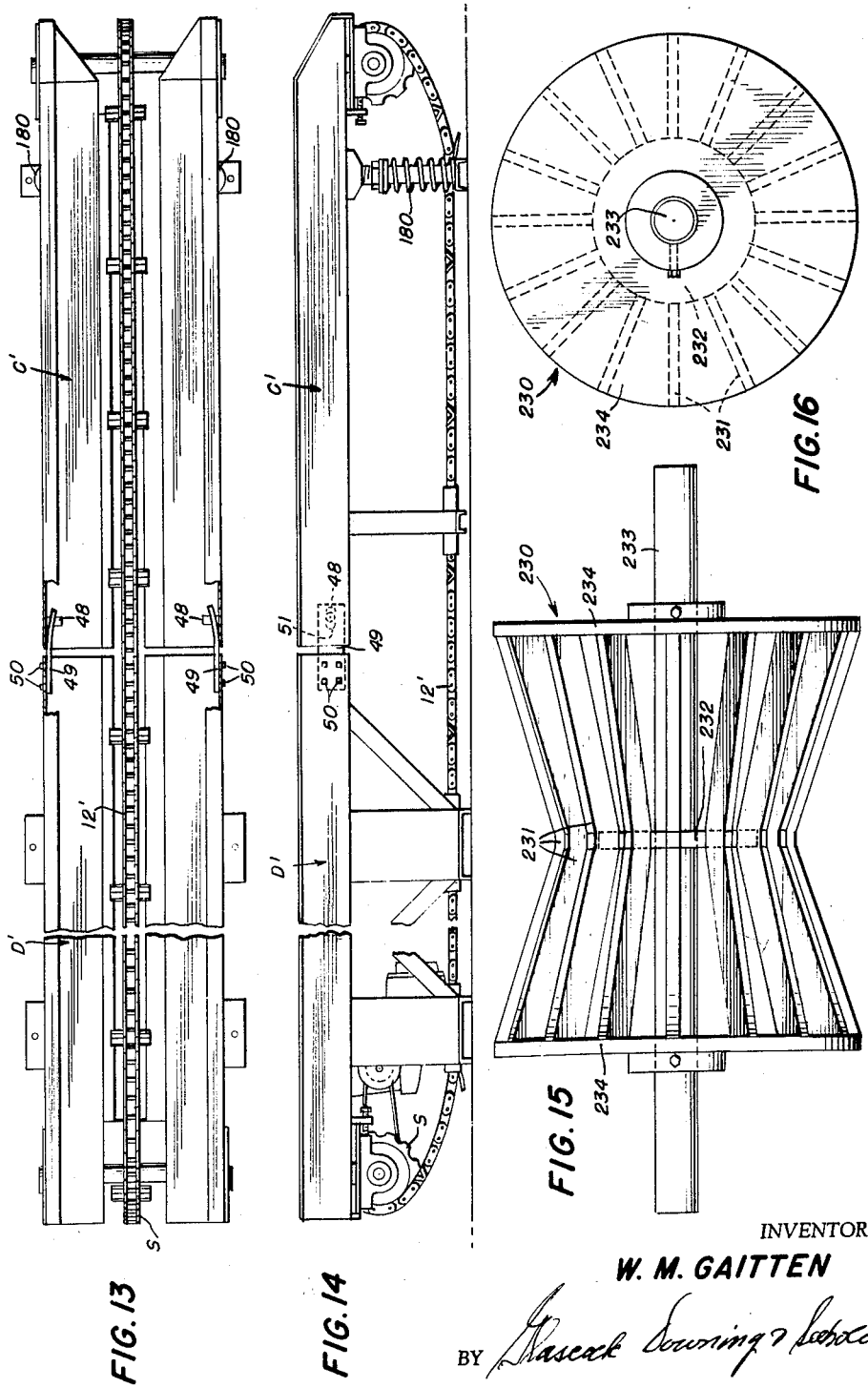
INVENTOR
W. M. GAITTEN
BY
ATTORNEY Dec. 8, 1959  W. M. GAITTEN  2,916,064
LOG CONVEYING SYSTEM FOR A DEBARKING MACHINE
Filed Sept. 26, 1956  7 Sheets-Sheet 6

INVENTOR
W. M. GAITTEN
BY
ATTORNEY

Dec. 8, 1959   W. M. GAITTEN   2,916,064
LOG CONVEYING SYSTEM FOR A DEBARKING MACHINE
Filed Sept. 26, 1956   7 Sheets-Sheet 7

INVENTOR
W. M. GAITTEN

BY *Hascock Downing & Seebold*

ATTORNEY

# United States Patent Office 2,916,064
Patented Dec. 8, 1959

2,916,064

LOG CONVEYING SYSTEM FOR A DEBARKING MACHINE

Walden M. Gaitten, Sylacauga, Ala., assignor to Soderhamn Machine Manufacturing Co., Talladega, Ala., a corporation of Alabama Application September 26, 1956, Serial No. 612,220

10 Claims. (Cl. 144—247)

This invention relates to log-debarking devices and more particularly to a debarking system including a conveyor to deliver logs to a debarking machine of the rotary hollow-head type, such a debarking machine, and a conveyor to remove the logs from the debarking machine.

The conveyors for carrying the logs to and from debarking machines must, of course, be capable of handling the heaviest logs and, for this reason, have in the past been made of very heavy materials and are very rigid. This rigidity has been necessary especially where crooked legs are encountered by a rotary, hollow-head-type debarking mechanism. The ends of crooked logs are forcibly thrust to one side or the other with a whipping or gyrating action so that heavy blows are delivered to the conveyor structures.

With such heavy rigid structures, difficulty is experienced when sequentially feeding logs of different diameters. If the conveyor is arranged at a height to feed logs of average diameter to the hollow-head of the debarking machine, then logs either larger or smaller than average will be fed to the debarking device out of alignment. A heavy log, fed out of alignment, will, of course, subject the debarking machine to heavy shock effects.

The above-described conditions moreover may cause the log to be thrown sideways, or the end of the log may whip sideways, or, in fact, in any direction due to crookedness causing a hazardous condition for personnel working in the area.

It is, therefore, an object of the invention to provide a debarking system having log conveyors on each side of a debarking machine of the rotary hollow-head type that will absorb the shock of blows from a crooked log fed through the debarking machine.

It is a further object to provide such conveyors with guards that will restrain the logs, especially short light logs, so they cannot be thrown from the machine.

A still further object of the invention is to provide a conveyor that will feed logs to a debarking machine; that, within the capacity of the machine will accurately and automatically center the log regardless of its diameter or length, and that will form, with the debarking machine, a complete unit capable of handling logs and poles from the smallest diameter to the largest diameter.

It is a still further object of the present invention to provide a conveyor system, for feeding logs to and from a debarking machine, that is substantially lighter in structure and more durable than previously known log conveyors.

It is an additional object to provide in an arrangement for conveying logs to a debarking machine, two aligned conveyor sections each including drivable components for feeding logs, the two sections being connected at their adjacent ends by a joint which will permit the free end of the section nearest the debarking machine to move or swing in a vertical plane and to shift, slew or swing sideways in a horizontal plane, and said free end of said section nearest the debarking machine being resiliently supported by means which will permit said vertical movement and said horizontal shifting or slewing movement.

Other and further objects and advantages of the invention will be apparent from the following description taken in connection with the accompanying drawings in which:

Figure 1 is a side elevation of a debarking system showing the conveyors of the present invention in use.

Figure 2 is a plan view of the arrangement shown in Figure 1.

Figures 9 and 10 are further enlarged views of the centering roll used on the conveyor of Figures 3, 4 and 5.

Figures 13 and 14 are views similar to Figures 11 and 12 but illustrating a modified outfeed conveyor arrangement, with the restraining shield removed.

Figures 15 and 16 are views similar to Figures 9 and 10 but illustrating a modified form of centering roll structure.

Figure 3:
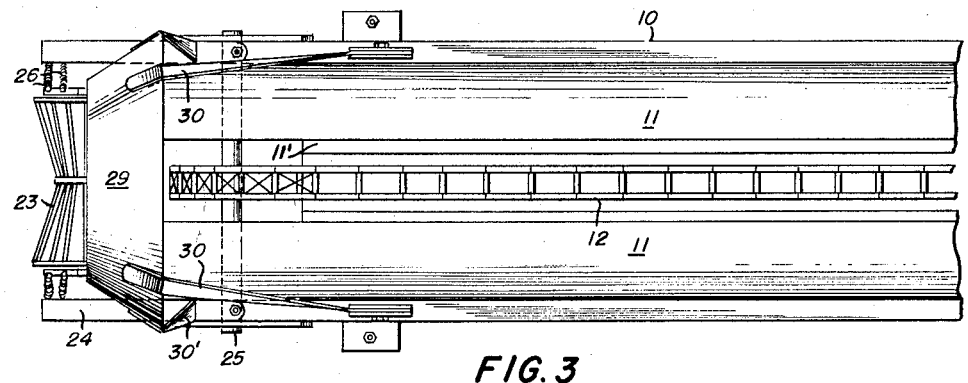
Figures 3, 4 and 5 are drawn on an enlarged scale and represent, respectively, a plan, a side elevation and a left-hand end elevation of that portion of an infeed conveyor mechanism that lies nearest the debarker.

As shown in Figures 1 and 2, a log is fed to a conveyor section A by any known log-handling means (not shown). The conveyor A, which may include more than one section (see Figures 11 and 12), feeds the log to a debarking machine B. The log passes through the hollow head of the debarking machine B where the bark is removed and the log then passes to an outfeed conveyor arrangement including at least two sections such as C and D.

Each of the conveyor sections shown includes spaced channel irons 10 along each side for supporting a sheet-steel trough 11 having a depressed bottom 11' in which an endless log-feeding chain 12 travels. Sheet metal parts 10' close the ends of channel irons 10. The conveyor section frame includes channel irons 10" that extend transversely of the trough and underlie the base of the depressed bottom. The chain 12 is operated by a sprocket 13 mounted under each end of the trough. Each of the chains may be driven by an electric motor through suitable gearing as indicated especially in Figures 4 and 7.

That portion of the conveyor A remote from the debarking machine is supported near its rear end, that is, the end more remote from the debarker, by stationary upright legs 14, Figure 1, to which the section is connected by a pin joint as at 15 to support the conveyor for swinging in a vertical plane and for limited lateral movement.

Figure 4:
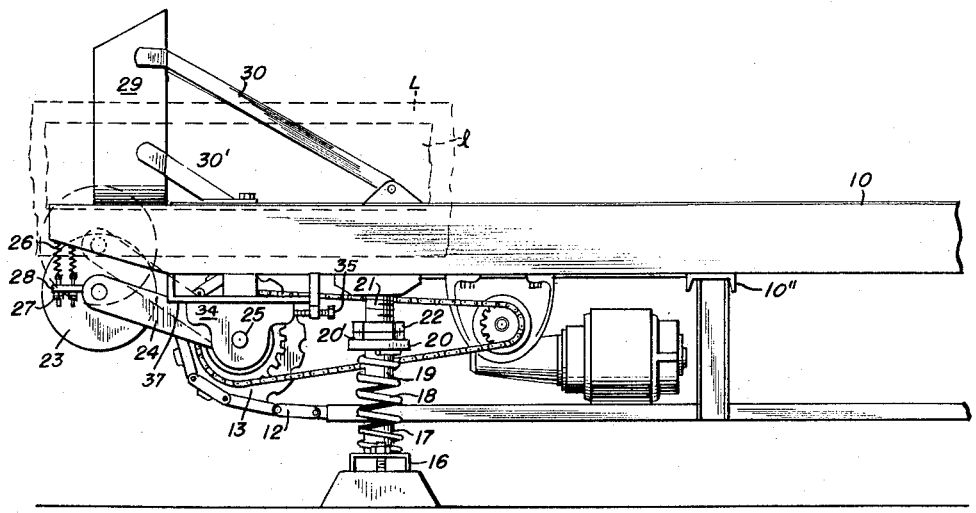
Figure 5:
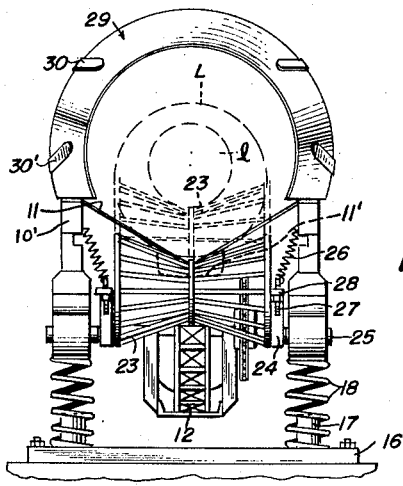

The infeed conveyor A is supported at the end nearest the debarker on spring legs as seen in Figures 4 and 5. A transverse base 16, which may be a channel bar, is mounted on a suitable foundation and is provided with upwardly extending studs 17. The studs 17 are preferably in the form of short, hollow sleeves welded to the top of the channel bar. Springs 18 telescope over the studs 17 and extend upwardly. Fitting within the upper end of each spring 18 is a sleeve construction which includes a short length of hollow sleeve 19 having an annular ring 20 welded to the end thereof and an internally threaded nut 20' is welded to the upper face of the ring 20. These sleeve components are threaded over the external threads of depending bolts or studs 21 rigidly connected to the undersurface of the side channels 10. Jam nuts 22 are also threaded over the studs 21. It is to be pointed out that the springs act as a free column since there is no continuous internal sleeve which would restrict gyration. Obviously, the height of the upper short-sleeve means comprised by the interconnected nut, ring and sleeve section 19 can be adjusted as to height which will, of course, vary the spring force.

Figure 11:
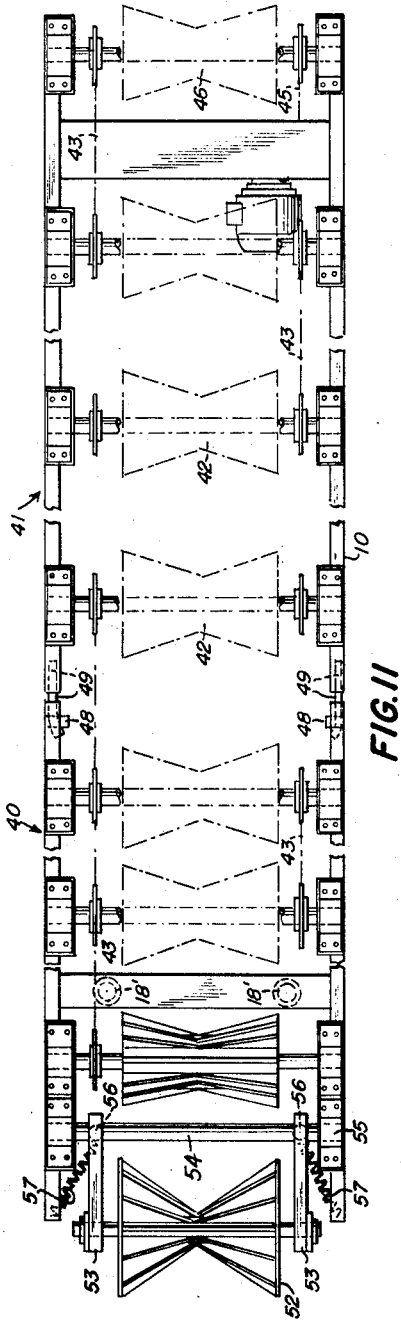
Figures 11 and 12 are, respectively, a plan and a side elevation of a modified infeed conveyor that is formed in two sections.
Figure 12:
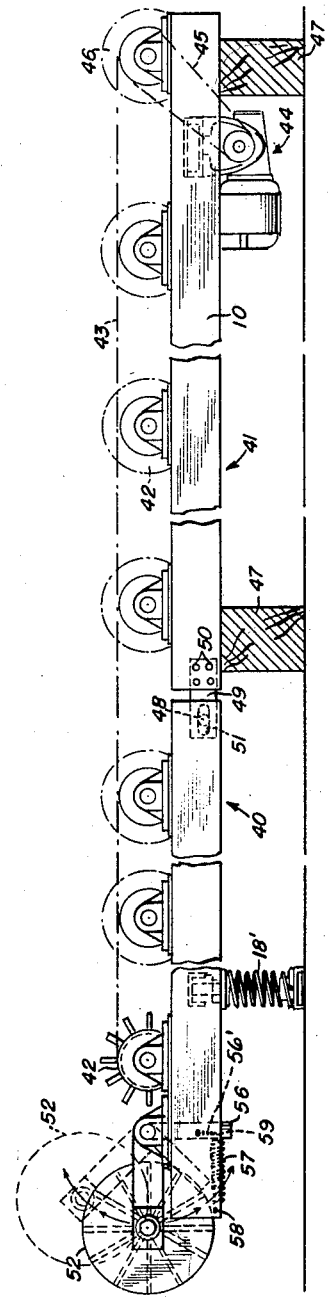

When using a two-section infeed conveyor, such as shown in Figures 11 and 12, that conveyor section nearest the debarker is connected to the other section by a joint shown in Figures 11 and 12. Thus, on the inside of the channel irons 10 on the end of the section nearest the debarker are inwardly extending pins 48. On the adjacent end of the remote section are bolted longitudinally extending strip members 49 having slots 51 therein that extend longitudinally of the line of movement of the log and which slots accommodate the pins. In one constructional embodiment the pins are 2" in diameter and 3" long, while the slots are 5" in length and 2¼" in vertical extent. Since this type of joint is provided between each pair of normally aligned side channels of the two-section conveyor, the free end of that section nearest the debarker can swing up and down and slew or shift sideways to a certain extent. Also, the jointed end of this front section has limited horizontal shifting or swinging movement.

The debarking machine with which these conveyors are particularly designed to be used is disclosed in application Serial Number 573,279 filed March 22, 1956, in the names of P. G. Brundell and K. E. A. Jonsson and entitled "Machine for Removing Bark from Logs," now Patent No. 2,857,945 granted October 28, 1958. This debarker has spaced feed rollers, on the side from which the logs are fed to the machine, that have a limited centering action, but not sufficient to prevent trouble when logs are fed to said rollers from a fixed-level conveyor and vary in size from small logs to the maximum size that the machine can handle. It will be noted, however, that the debarker used in the present system may be of other design than the one indicated.

It will be seen then, referring again to Figure 1, that a fairly heavy log placed on the conveyor A will, as it approaches the debarking machine, bear the front section of the conveyor down, and a somewhat heavier log will bear the conveyor down somewhat further. By selecting a spring of proper strength, it will be seen that the conveyor will automatically adjust itself vertically to center the logs as they approach the debarking machine.

Since very light logs, or poles, may not have sufficient weight to depress the trough of the conveyor against the strength of springs required for heavier logs, a centering roller 23 is provided at that end of the log-feeding conveyor adjacent the debarking machine. The centering roller 23 is supported for free rotation on arms 24 that are pivoted about an axle 25 that also acts as the axle for the chain-driving sprocket 13. Springs 26, fixed at their upper ends to the channels 10, are secured to the arm 24 by adjustable eye bolts 27 passing through an extension 28 of the arms 24. These springs 26 are selected and adjusted so that the smallest log or pole to be debarked the centering roller is in its highest position and will correspondingly lift the leading end of a light pole to centered position. Successively heavier logs will bear the centering roller down and will be lifted a lesser amount. A log so heavy as not to be lifted by the springs 26 into centered position, may also be so heavy that the springs 18 will come into play and determine the height of the infeed end of the conveyor. The centering rollers 23 also center each log, whether light or heavy, in the horizontal plane. The spring force applied to urge the roller 23 upwardly is such that the log-contacting center portion of the centering roller is normally disposed above the level of the upper run of the feeding chain 12 a distance approximately equal to ½ of the diameter of the centering roller. Thus, in Figure 5 is shown in broken lines a large log L that has depressed the centering roller 23 to said level of the upper run of the feeding chain 12, and a small log l that is supported by the centering roll in its highest position.

Taking care that the logs and poles are fed to the debarking machine with a minimum of eccentricity, will reduce the amount of whipping of the logs as they enter the debarking machine. For straight logs, the whipping is eliminated. It has been found, however, that there is still some hazard of whipping by crooked logs, and where the log is both light and crooked, it will occasionally be thrown to one side by striking one of the feed rollers on the debarking machine. For this reason, a segmental hood 29 is provided to protect workmen or observers. This hood is somewhat funnel shaped and is provided with bracing arms 30, 30'.

The structure of the debarking machine per se is the subject matter of a different application as noted above. It will be noted, however, that because of varying log weights and the whipping motions of logs emerging from the rotating debarking chamber of the debarking machine, it is found to be desirable to provide, on the discharge side of the debarking machine, a second hood or guard device to prevent such logs from leaving the path of the conveyor.

Figure 6:
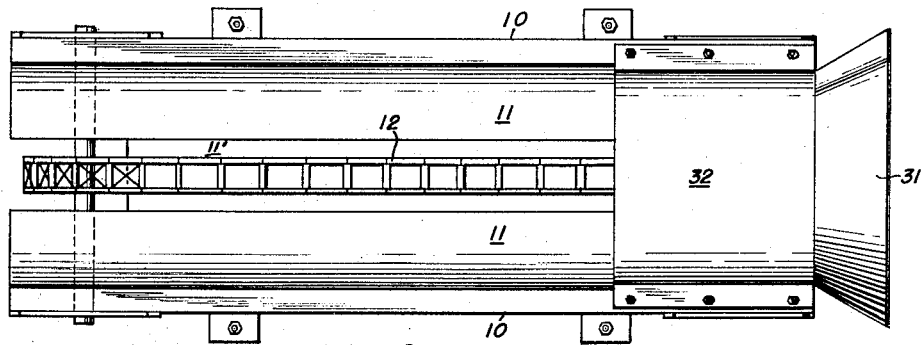
Figures 6, 7 and 8 are, respectively, a plan, a side elevation, and a left-hand end elevation of that section of an articulated, outfeed conveyor mechanism that lies nearest the debarker.
Figure 7:
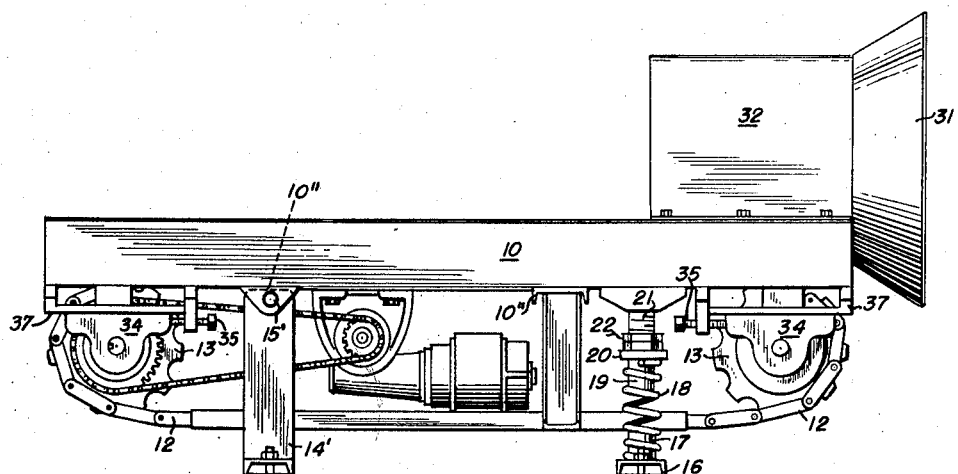
Figure 8:
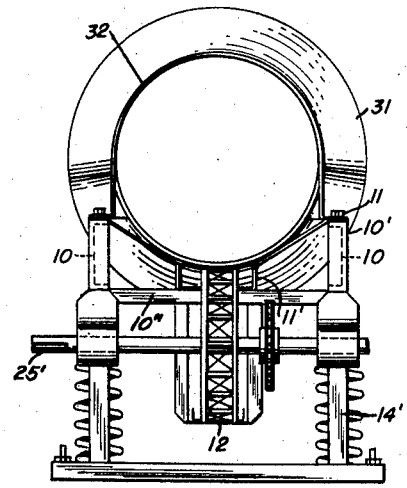

The hood or guard on the conveyor section C to which the debarking machine delivers the debarked logs is clearly shown in Figures 6, 7 and 8. A funnel-shaped portion 31 extends from the conveyor frame, which, like conveyor section A is formed of channels 10 and a sheet-metal trough 11. It will be noted from Figure 8 that the funnel-shaped portion 31 represents a complete ring, as distinguished from the conoidal segment forming the hood 29, and that its lower portion is slightly higher than, and substantially tangential to, the sides of trough 11. It will be understood that by this means it will be impossible for a crooked log, in which the leading end turns downward, to hit the forward end of the conveyor trough 11. Any such crooked log emerging from the debarking machine and hitting the funnel portion 31 will both deflect the conveyor, as described below, and will be directed onto the conveyor by the funnel-shaped portion. The funnel portion 31 is mounted on an inverted U-shaped guard portion 32 extending along the conveyor and fastened to the frame elements 10.

The last "kick" of the debarking machine as a log passes from it will sometimes throw even heavy logs to one side, and in any case the weight of each log will be suddenly transferred to the conveyor from the debarking machine.

So it is seen that this conveyor section C must be capable of withstanding heavy impacts. For this reason, the conveyor section C is constructed in a degree like the conveyor section A described above. The frame channels 10 are supported, near their ends remote from the debarking machine, on stationary legs 14', to which they are pivoted by means of loosely fitting pins 15' so that the free end of the conveyor section C may swing and thus absorb the blows of logs passing thereover. As with the conveyor portion A, that end of the conveyor C adjacent the debarking machine is supported on springs 18, which are mounted in precisely the same manner as shown and described above in connection with the conveyor portion A. It will be understood then that as each log passes through the debarking machine B its weight will be transferred to the conveyor C in a fairly sudden manner in any case, and that the springs 18 will absorb this blow. Also certain logs will, due to a whipping action induced by the debarking operation, strike in any direction against any one of the hood 31, the conveyor end or the guard element 32, and the resulting blow will also be absorbed by the resiliency of the supporting springs 18.

A conveyor portion D is a stationary continuation of the conveyor portion C and, as shown in Figure 1 may be driven by the motor that drives the conveyor portion C, a shaft 25' being extended to accommodate a driving sprocket, not shown. Other arrangements are possible, see Figures 13 and 14, in which a common chain 12' is used for both portions C' and D' and a motor driven sprocket is located at the end of conveyor portion D' remote from the debarking machine.

Details of construction of the centering roller 23 are shown in Figures 9 and 10. As seen in these figures, the roller is made of steel rods 23' bent into shallow V's, passing through a central disc 23" and secured, as by welding, to end discs 23. For heavier duty, see Figures 15 and 16, a modified roller 230 is used. This centering roller is made of log contacting ribs 231 in the form of shallow V's cut from steel plate, the apices of a V's being secured to the central disc 232 on the supporting shaft 233 for the roller, with each V lying in its own radial plane and being welded to end discs 234.

It is further to be pointed out that in some installations on the outfeed side of the debarking machine an elongated two-part section may be provided with a single outfeed chain, the front section C', that is, the one adjacent the debarking machine, being pivotally connected to the adjacent end of the other section by the flexible plate pin-and-slot connection including elements 48, 49, 50, and 51 as also shown in Figures 11 and 12 and the uprights 14' being eliminated, see Figures 13 and 14. In other words, the two sections C', D' are pivotally interconnected intermediate their ends and the vertical support for the end of the section C' adjacent the debarking machine is the spring supporting means 180. It is also possible to construct a second modified form, see Figures 20 and 21, of infeed conveyor in the same way, that is, have two aligned trough sections 70, 71, a common log feeding chain 125 (instead of the log-feeding rollers of the form shown in Figures 11 and 12), uprights 72 rigidly supporting the trough section 71 that is remote from the debarker, the two trough sections being connected by a pin-and-slot connection including the elements 48 to 51 which correspond to the arrangement shown in Figures 11 and 12.

Figure 17:
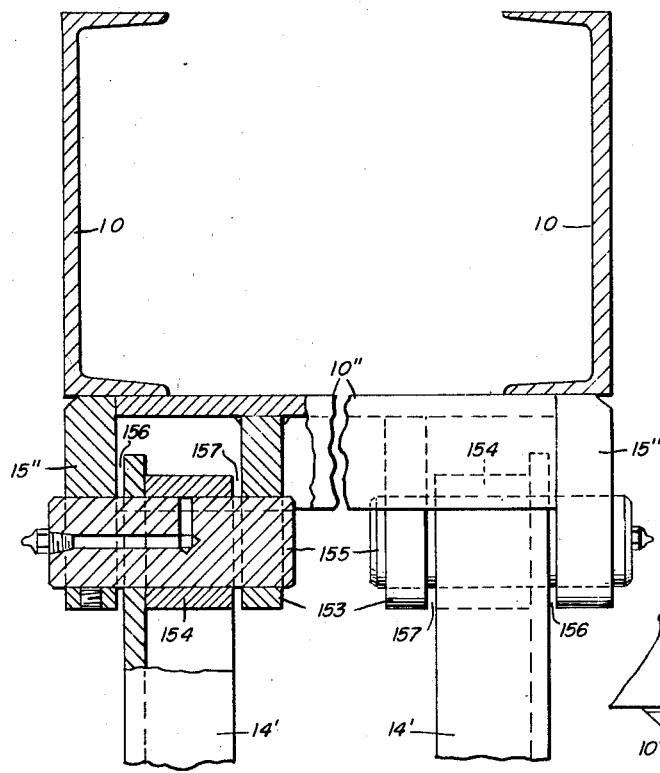
Figure 17 is a view partly in elevation and partly in cross-section taken transversely of the conveyor and illustrating on an enlarged scale a pin joint such as shown in Figures 1 and 7.
Figure 18:
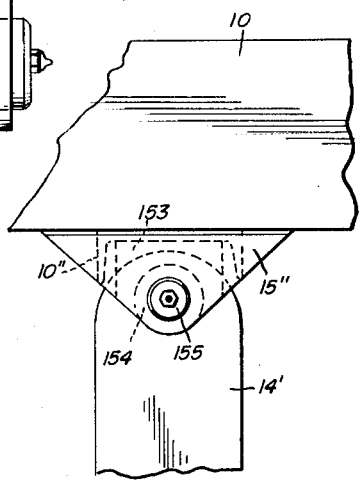
Figure 18 is an end view of the arrangement shown in Figure 17.

The pin joint shown at 15 and 15' in Figure 1 and at 15' in Figure 7 is a connection between the upright legs and a bracket means depending from the conveyor frame. The construction of such a joint is shown in Figures 17 and 18, thus the joint includes one of the transverse channel irons 10" extending across and welded to the undersurface of the side frames 10, as shown in Figure 7. To the web of this channel iron and spaced inwardly from each of the outer ends thereof is welded a depending bracket 153 having a pin receiving aperture therethrough. A further depending bracket, such as at 15", is welded to each of the outer ends of the transverse channel iron 10" and to the undersurface of the side frame channel irons 10. The opposed uprights or legs 14' are channel irons with the flanges directed inwardly. At the top of each of these legs and on the interior thereof is welded a piece of tubing 154 which receives a pin 155. The limited side shifting or deflecting movement is accommodated by the fact that there is a clearance space 156 between the depending bracket 15" and the exterior of the leg and a similar clearance space 157 between the outer end of the tubing which receives the pin and the adjacent face of the depending bracket welded to the undersurface of the transverse channel irons. This clearance space, of course, can be predetermined by the initial spacing between the two depending brackets that are on the interior of the joint.

Where two aligned sections are used for either the infeed or the outfeed conveyor, the sole connection between the one adjacent the debarker and the remote section can be effected by the connecting means disclosed in the infeed conveyor of Figures 11 and 12, in which case uprights 14' and pin connections 15' (see Figures 1 and 7) at the remote end of that section nearest the debarker can be eliminated.

Figure 19:
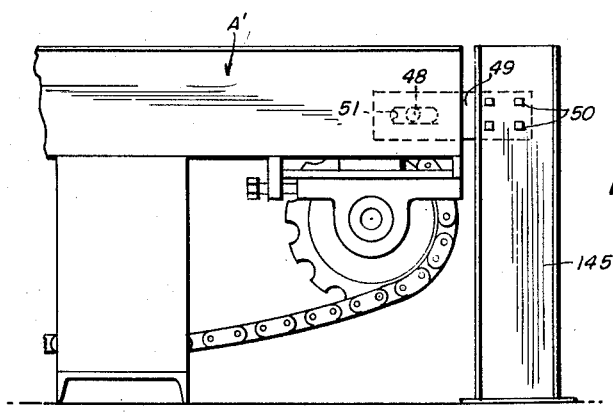
Figure 19 is a fragmentary view illustrating in side elevation a modified mounting of a single section infeed or outfeed conveyor.

Additionally, see Figure 19, only one section can be used on the infeed side or outfeed side. The longitudinally extending slotted plate members 49 that accommodate the pins 48 on the end of the section, such as A', can be carried by any vertical support, such as, posts 145 so that the invention comprehends the conveyor section supported at the end adjacent the debarker by the spring legs and at its other end by a supporting means which permits vertical swinging movement and limited horizontal shifting movement regardless of whether this supporting means is carried by another conveyor section, such as in Figures 11 and 12, or by separate vertical uprights, Figure 19.

It is also to be pointed out that the bearing blocks 34 (see Figure 7) carrying the sprocket supporting shafts are all slidably mounted on a frame 37 secured to the undersurface of the side channel irons and a suitable adjusting bolt 35 is associated with each bearing block for adjusting the positions of the bearing blocks and thus the sprocket axles and thereby to effect tightening of the chain.

The first modified form of infeed conveyor, which is shown in Figures 11 and 12 includes a conveyor section 40 that is adjacent the debarker and another section 41 remote from the debarker, and mainly differs from the infeed conveyor of Figure 1, by having a plurality of troughed rollers 42 substituted for the conveyor chain 12 and trough 11. The rollers 42 are coupled in pairs by chain sections 43, so that an electric motor-gearing combination 44, which drives a chain 45 trained over drive sprocket 46, can impart drive to all the rollers. The section 41 is mounted by any suitable support, such as, timbers 47 so that this section is stable. The conveying line of the troughed rollers of this section is level with respect to the rotary head of the debarking machine. The conveyor section 40 that is adjacent the infeed side of the debarking machine is supported at one end by resilient spring means 18' similar in structure and operation to the arrangement of Figures 4 and 7. The remote end of this section 40 has the pair of pins 48 extending inwardly from the channel irons 10 that constitute the sides of the conveyor frame. These pins are accommodated in the slots 51 in the metal strip members 49 that are attached by a nut and bolt means 50 to the interior of the channel members 10 of the conveyor section 41. As set forth previously, the slot 51 in the strip or plate members 49 has a length more than twice the diameter of pin 48 and this slot further is deeper or wider than the diameter of pin 48 so that the section 40 can swing up and down relative to the section 41. The slotted ends of the strip or plate members 50 are curved toward one another so as to constitute in effect flexible hinge plates, this curvature and flexibility facilitating limited horizontal shifting or swinging movement.

The centering-roll structure in this first modified form of infeed conveyor includes a centering roll proper 52 composed of a pipe core, opposite end plates and angular shaped web plates welded to the core and end plates so as to provide a troughed centering roll. The roll shaft is freely mounted in bearings carried in the ends of arms 53 which are in turn rigidly secured to a cross shaft 54, the outer ends of this shaft being supported in suitable bearing blocks 55 similar to bearing blocks accommodating shafts of the various rolls 42.

In order to resiliently balance the centering roll, additional arms 56 are connected to and depend from the arms 53. Each of these arms is provided with a plurality of vertically spaced pin accommodating apertures 56' for selectively receiving a pin 59 to which one end of a spring 57 is fastened. If desired, a plurality of vertically spaced pins can be permanently mounted to the arms 53. The other ends of the springs are fastened to pins 58 extending inwardly from the inner faces of the channel frames 10. The springs are selected as to strength and tension so as to normally dispose the centering roll a distance above the center of the rolls 42 approximately equal to ½ the diameter of the centering roll whereby large and heavy logs will depress the centering roll, but light logs and poles will be elevated by the centering roll into the grasp of the infeed rollers of the debarking machine. As is the case with the other forms of the invention, if an especially heavy log is being fed, the spring legs 18' come into operation to assist in centering.

Figure 20:
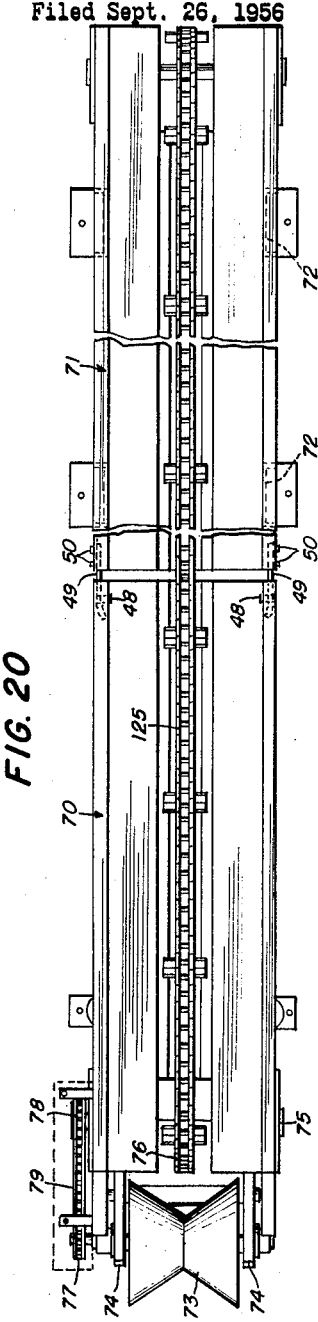
Figures 20 and 21 are views similar to Figures 11 and 12 but illustrating a modified infeed conveyor arrangement with a driven centering roll but with the restraining shield removed.
Figure 21:
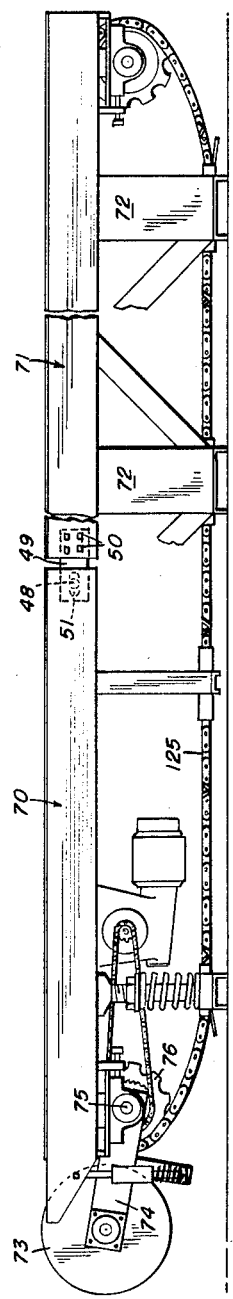

In Figures 20 and 21 is shown a modification in which the infeed conveyor includes sections 70, 71 with the latter section supported by uprights 72. A centering roll 73 is carried on a shaft journalled in arms 74 pivoted on shaft 75 which carries the drive sprocket 76 for conveyor chain 125. The drive for this chain is similar to the arrangement shown in Figure 4. In this form, however, the centering roll is driven. To accomplish this the shaft for the centering roll is extended and carries a sprocket 77. Similarly, shaft 75 is extended and carries a sprocket 78 and a drive chain 79 is trained over these sprockets.

It is, therefore, clear that the invention provides a debarking system which includes a stationary debarking machine having a rotary hollow head through which logs to be debarked are fed, at least one log-feeding-and-centering conveying arrangement on the infeed side of the head and at least one debarked-log-receiving conveyor arrangement on the outfeed side of the debarking machine. The respective conveyor arrangements each including at least one section having log-moving means for respectively moving logs to and from the debarking machine and each section including an end adjacent the debarking machine resiliently supported for up-and-down movement and lateral deflection and with each section having an end remote from the debarking machine pivotally supported by a loose pivot connection permitting up-and-down movement and a limited amount of lateral deflection. The conveyor arrangement further includes on the infeed side of the debarking machine a troughed centering-roll mechanism pivotally supported for movement toward and away from the axis of the debarking machine, spring-urged to an upper position and operative to center logs relative to the infeed side of the debarking machine and further to elevate the ends of small diameter logs to center them in the vertical as well as the horizontal plane. The arrangement further includes shield means associated with respective ends of the conveyor arrangements that are immediately adjacent the opposite faces of the debarking machine, as regards the axis of rotation of the hollow head. The shield means surround the path of movement of logs and limit any whipping or gyrating action imparted to the respective ends of logs in their movement to and from the debarking machine and further limit whipping or gyrating action of the trailing end of a crooked log entering a debarking machine or the leading portion of a crooked log leaving such machine.

Modifications may be effected in the structure illustrated as long as they do not depart from the scope of the appended claims.

What is claimed is:

1. A debarking system including a stationary debarking machine having a rotary hollow head through which logs to be debarked are fed, at least one feeding-and-centering conveying arrangement on the infeed side of a head, at least one debarked-log-receiving conveyor arrangement on the outfeed side of the machine, said respective conveyor arrangements each including at least one section and having log-moving means operably associated therewith for respectively moving logs to and from the debarking machine, means resiliently supporting that end of each section adjacent the debarking machine for vertical and lateral deflection, and means supporting that end of each section remote from the debarking machine for rocking movement in a vertical path and for limited lateral deflection.

2. A debarking system as claimed in claim 1 in which the respective conveyor arrangements that are adjacent the respective infeed and outfeed sides of the debarking machine each includes a trough having a depressed bottom and upwardly and outwardly inclined sides; in which a log-feeding chain is supported for movement along the depressed bottom; in which said supporting means for that end of each section adjacent the debarking machine includes threaded stud means depending from a corresponding end of said trough, upwardly extending, fixedly mounted stud means located beneath the depending stud means, annular means in threaded engagement with the depending stud means, and compression springs telescoped over the upwardly extending stud means and said depending stud means so as to support said corresponding end of the trough for up and down movement and lateral deflection; and in which supporting means for that end of each section remote from the debarking machine includes a stationary support and a pivot connection between the support and the trough permitting up and down rocking movement and limited lateral deflection of the trough at said pivot connection.

3. A debarking system including a stationary debarking machine having a rotary hollow head through which logs to be debarked are fed, at least one feeding-and-centering conveying arrangement on the infeed side of a head, at least one debarked-log-receiving conveyor arrangement on the outfeed side of the machine, said respective conveyor arrangements each including at least one section and having log-moving means operably associated therewith for respectively moving logs to and from the debarking machine, means resiliently supporting that end of each section adjacent the debarking machine for vertical and lateral deflection, means supporting that end of each section remote from the debarking machine for rocking movement in a vertical path and for limited lateral deflection, and further including on the end of the feed-and-centering conveying arrangement adjacent to the infeed side of the head a troughed centering roll pivotally supported for movement toward and away from the line of movement of logs to the head, resilient means normally urging the roll to an upper position so that the roll is operative to center logs relative to the infeed side of the debarking machine and to elevate the ends of small-diameter logs to center them in the vertical as well as the horizontal plane.

4. A debarking system as claimed in claim 3 and further including shield means associated with the respective ends of the conveyor arrangements that are immediately adjacent the infeed and outfeed sides of the debarking machine, said shield means surrounding the paths of movement of logs so as to limit any whipping or gyrating action imparted to logs in their movement to and from the debarking machine.

5. An infeed conveying arrangement for a debarking machine comprising at least one conveyor section, drivable means on said section for forwarding logs, that end of said section remote from the debarker having pin means on opposite sides thereof, stationarily supported apertured-plate means accommodating said pin means, the apertures in the plates having two mutually perpendicular dimensions greater than the size of the pin means and said plate means being laterally flexible, whereby the conveyor section can swing up and down and swing horizontally to a limited extent, and vertically extending resilient means supporting the opposite end of the conveyor section for vertical and horizontal movement.

6. An infeed conveying arrangement as claimed in claim 5 and further including a centering roll at the end of the section adjacent the debarker, means supporting said roll for vertical swinging movement and means normally urging the roll upwardly above the line of movement of the lower surface of a log being conveyed so that said roll is operative to be depressed by heavy logs to center the same and to elevate the ends of lighter and smaller logs so that these are likewise centered relative to a line of movement through a debarking means.

7. A debarking system including a debarking machine having debarking mechanism through which logs to be debarked are fed, a conveying arrangement on the infeed side of said debarking machine to feed logs thereto and a conveying arrangement on the outfeed side of the debarking machine to receive logs that have been debarked, each conveying arrangement including mechanism for respectively moving logs to and from the debarking machine, each conveying arrangement including at least one section, means resiliently supporting that end of each said one section that is adjacent the debarking machine for vertical and lateral deflection, comprising spiral spring means having an intermediate portion unrestrained against lateral deflection, and opposite ends restrained against such deflection, and pivot means supporting that end of each said one section remote from the debarking machine for rocking movement in a vertical path, and for limited lateral deflection.

8. A debarking system as claimed in claim 7 in which said pivot means includes horizontally disposed pin means carried by the end of each section remote from the debarking machine, and having free ends directed toward one another from opposite sides of the respective sections, and stationarily supported apertured plate means anchored at one end and accommodating the respective pin means, the apertures in the plate means having two mutually perpendicular dimensions greater than the size of the pin means, said plate means each curving inwardly toward the center of the respective conveying arrangements, so that the free end of each plate means curves inwardly along its associated pin means, and each plate means being laterally flexible to permit vertical rocking movement and limited horizontal movement of the respective conveyor sections adjacent the debarking machine.

9. A log-conveying arrangement for a debarking machine comprising at least one conveyor section, drivable means on said section for forwarding logs, that end of such section remote from the debarker having horizontal pin means extending inwardly from opposite sides and in alignment with one another, stationarily supported apertured-plate means accommodating said pin means and anchored at an end thereof that is remote from the debarking machine, the apertures in the plate means having two mutually perpendicular dimensions greater than the size of the pin means, each said plate means having a free end disposed laterally inwards of their anchored ends, and said plate means being laterally flexible, whereby the conveyor section can rock up and down and shift horizontally to a limited extent, and vertically extending resilient means having opposite supported ends and an intermediate unrestrained portion for supporting the opposite end of the conveyor section for vertical movement and limited horizontal deflection.

10. A log-conveying arrangement for a debarking machine as claimed in claim 9, and including two aligned conveyor sections, said drivable means for forwarding logs being operatively associated with each section, the remote end of that section nearest the debarking machine having said pin means thereon, the adjacent end of the other of the two sections supporting said apertured-plate means and said vertically extending resilient means being disposed adjacent the end of the section that is nearest the debarking machine.

References Cited in the file of this patent

UNITED STATES PATENTS

| | | |
|---|---|---|
| 1,016,442 | Roberts et al. | Feb. 6, 1912 |
| 2,543,128 | Power | Feb. 27, 1951 |
| 2,625,968 | Eklund et al. | Jan. 20, 1953 |
| 2,643,691 | Rockwood | June 30, 1953 |
| 2,646,092 | Kolpe et al. | July 21, 1953 |
| 2,655,961 | McComb | Oct. 20, 1953 |
| 2,794,464 | Meiklejohn | June 4, 1957 |
| 2,794,466 | Leffler | June 4, 1957 |
| 2,815,776 | Annis et al. | Dec. 10, 1957 |

FOREIGN PATENTS

| | | |
|---|---|---|
| 704,814 | Great Britain | Mar. 3, 1954 |